Nov. 25, 1930.  R. B. HUNTER  1,782,424
MOTOR CONTROLLER
Filed Aug. 24, 1928
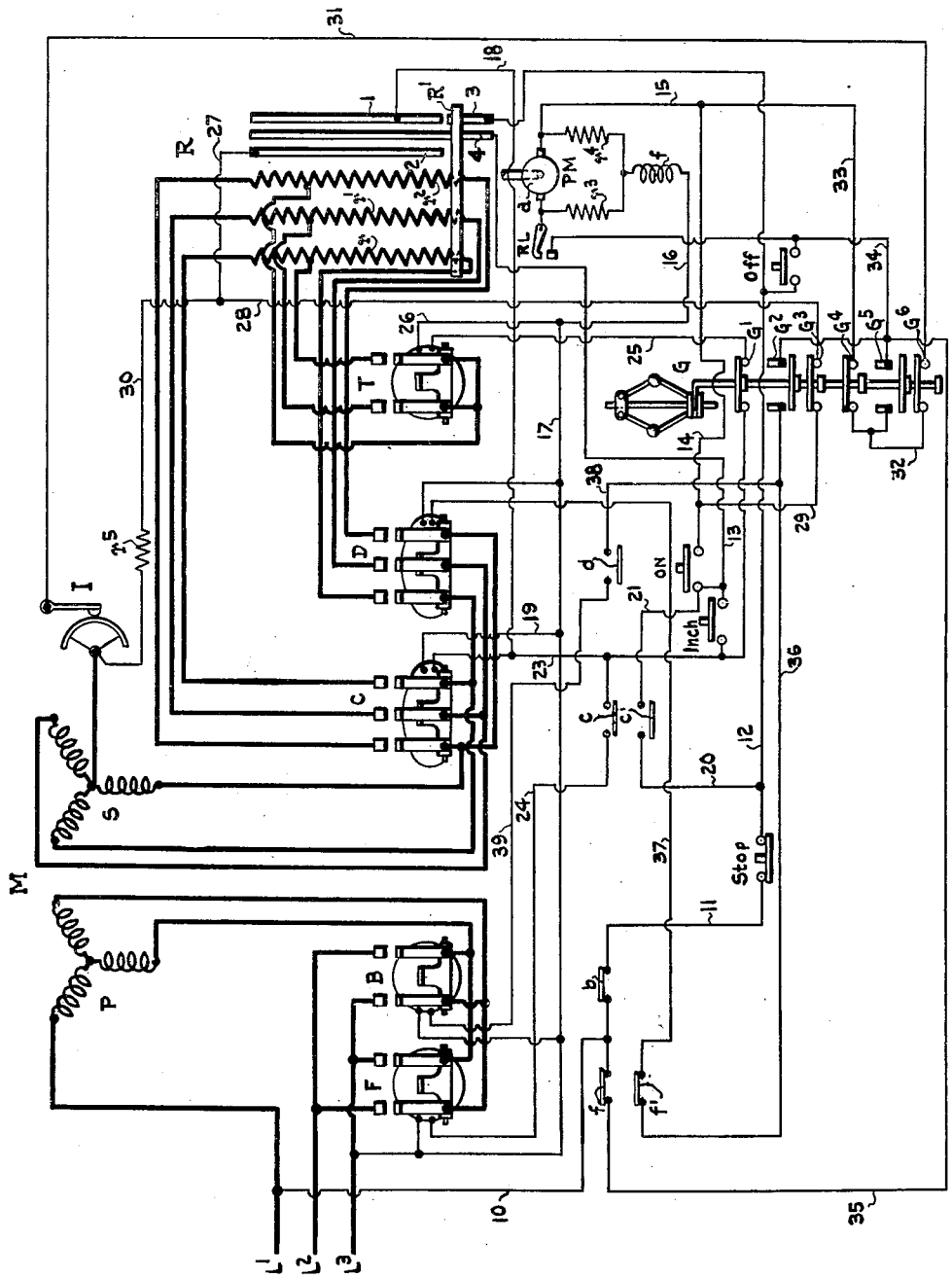
INVENTOR
Richard B. Hunter.
BY
ATTORNEY Patented Nov. 25, 1930

1,782,424

UNITED STATES PATENT OFFICE

RICHARD B. HUNTER, OF SHOREWOOD, WISCONSIN, ASSIGNOR, BY MESNE ASSIGNMENTS, TO CUTLER-HAMMER INC., OF MILWAUKEE, WISCONSIN, A CORPORATION OF DELAWARE

MOTOR CONTROLLER

Application filed August 24, 1928. Serial No. 301,795.

This invention relates to improvements in motor controllers.

Controllers embodying the invention are especially advantageous for motors employed to drive printing presses, although not limited thereto.

An object of the invention is to provide a controller whereby a single motor may in some instances be advantageously employed in lieu of the customary two motor drive to afford operation of the press or other driven device at slow speed, as for threading of a web and at higher speeds such as are desired for printing.

Another object is to provide for such control by simple and efficient means.

Another object is to utilize in such control the well known motor driven crosshead rheostat, and to utilize such rheostat in maintaining the slow speed substantially constant.

Other objects and advantages of the invention will hereinafter appear.

The accompanying drawing illustrates diagrammatically one embodiment of the invention which will now be described, it being understood that the invention is capable of embodiment in other forms without departing from the scope of the appended claims.

Referring to the drawing, the controlled motor M selected for illustration is of the slip ring type having a three phase primary P to be supplied from lines $L^1$, $L^2$, $L^3$ and a three phase secondary S. It is, of course, to be understood that any other appropriate type of motor might be substituted for that illustrated.

The controller illustrated comprises reversing switches F and B to connect the motor primary to the supply line, switch F providing for forward operation of the press or other device driven by motor M, and switch B providing for braking of the motor by plugging. Also, the controller comprises a switch C to complete the secondary circuit of the motor through a crosshead type rheostat R for forward operation and a switch D to complete the secondary circuit of the motor through said rheostat for plugging.

As will later appear, the switch C is closed prior to closure of the forward primary switch F and opens upon opening of switch F, while switch D is closed prior to closure of primary switch B and opens upon opening of switch B. Further, as will later appear, the secondary switches C and D are adapted to connect the motor secondary to opposite ends of the rheostat, or in other words, to reverse the rheostat with respect to the motor secondary. Accordingly should the rheostat crosshead be in full speed position when switches F and C are opened and switches B and D closed for plugging all resistance will be included, whereas should the rheostat crosshead be in its opposite extreme position when switches B and D are opened and switches F and C are closed for forward operation all resistance will be included. On the other hand, should the crosshead be in an intermediate position upon closure of the plugging switches some of the resistance would of course remain short circuited by the crosshead, but this would not be objectionable, for when the motor is plugged while operating at the slower speed represented by such positioning of the crosshead a correspondingly smaller amount of resistance will suffice for plugging. As will later appear, the arrangement illustrated requires positioning of the crosshead for inclusion of all resistance prior to closure of the forward switches F and C.

More particularly, the rheostat R is provided with resistances $r$, $r^1$ and $r^2$ connected between the stationary contacts of switch C and switch D, the movable contacts of said switches being connected in parallel to the terminals of the motor secondary S. The resistances $r$, $r^1$ and $r^2$ are bridged by the crosshead $R^1$ of the rheostat, and said crosshead is adjustable with respect to said resistances by pilot motor PM. The pilot motor has an armature $a$ and a series field $f$ having well known reversing connections comprising a closed loop for the motor armature including resistances $r^3$ and $r^4$, the series field of said motor being connected to said loop between said resistances. The rheostat R is further provided with contact segments 1, 2, 3 and 4 to be engaged by the crosshead for commutation of control circuits as hereinafter explained and with a limit switch RL.

In addition to the foregoing elements the controller comprises the customary torque switch T for short-circuiting a portion of the rheostat resistance to facilitate starting, the usual "inch", "on", "stop" and "off" push button switches which are so designated on the drawing, an interrupter switch I driven by the motor M for a purpose hereinafter set forth, and a governor operated relay G responsive to variations in the speed of motor M for effecting control to be described.

The relay G, which for simplicity of illustration is shown as operable by a flyball governor, may be operated by any other preferred type of speed responsive device, as for example the hydraulic device now commonly employed in connection with electric motors for commutation of circuits in accordance with the speed of the motor. This relay has contacts $G^1$ to $G^6$, which are shown in conventional manner to provide for first opening contacts $G^1$ and closing contacts $G^2$, then opening contacts $G^3$ and $G^4$ progressively, then closing contacts $G^5$ and finally opening contacts $G^6$, normally open contacts $G^2$ and $G^5$ being illustrated as of a sliding type. This relay through opening of its contact $G^1$ deenergizes the torque switch after the motor is started and through opening of its contacts $G^3$ effects commutation of the pilot motor circuit to subject the pilot motor to the influence of circuit interrupter I and contacts $G^4$ and $G^5$. Further, the relay through its contacts $G^4$ and $G^5$ affords control of the pilot motor to maintain the main motor when operating at slow speed within given limits and through opening of its contact $G^6$ removes the pilot motor from influence by certain of the aforementioned contacts. Still further, the relay through its contacts $G^2$ controls maintaining circuits for the braking or plugging switches and for opening of said maintaining circuits when the motor speed is reduced to substantially zero value.

Certain of the switches heretofore mentioned are provided with auxiliary contacts, which for simplicity of illustration are represented by parallel lines directly beneath their respective switches, the showing of normally closed contacts being supplemented by a diagonal line.

The aforementioned slow speed provided for may be obtained by depressing the "on" button and then releasing the same after a temporary period. This completes circuit from line $L^1$ by conductor 10 through normally closed auxiliary contacts $b$ of switch B by conductor 11 through the "stop" switch by conductor 12 to contact 3 of rheostat R, thence through the crosshead $R^1$ to contact 4 by conductor 13 to and through the "on" switch by conductors 14 and 15 through the pilot motor armature $a$ from right to left and series field $f$ by conductors 16 and 17 to line $L^3$. This circuit for the pilot motor provides for its operation in a direction to advance the crosshead $R^1$ to engage segment 1 for energization of the forward switches F and C and the torque switch T. More particularly, the cross head engages segment 1 before it leaves segment 3, completing circuit from line $L^1$ to segment 3 as heretofore traced, thence through the crosshead to segment 1 by conductor 18 to and through the operating winding of switch C by conductors 19 and 17 to line $L^3$. Switch C is thereupon caused to respond to complete the secondary circuit of the motor through the rheostat and to complete the circuits of the forward switch F and the torque switch T, as well as a maintaining circuit for itself in parallel with the contact 3 of the rheostat. First considering the maintaining circuit for switch C, the same extends from line $L^1$ to and through the "stop" switch as heretofore traced by conductor 20 through auxiliary contacts $c^1$ of said switch C by conductors 21 and 13 to rheostat segment 4 and thence through the cross head to segment 1, from which circuit may be traced to and through the winding of switch C as heretofore explained. Next considering the energizing circuit of the forward switch F, the same extends from rheostat segment 1 by conductors 18 and 23 through auxiliary contacts $c$ of switch C by conductor 24 through the winding of switch F to line $L^3$, while the energizing circuit of the torque switch T extends from rheostat segment 1 by conductors 18 and 23 through the contact $G^1$ of relay G by conductor 25 through the winding of switch T by conductors 26 and 17 to line $L^3$. Thus provision is made for forward operation of the motor at slow speed, and as will be observed the relay G will be operated upon starting of the motor to open contacts $G^1$ for deenergization of the torque switch and inclusion of all resistance.

When the rheostat crosshead engages segment 1 it also engages segment 2, providing for the pilot motor a circuit through an auxiliary contact of switch C which parallels the circuit previously traced through the rheostat segment 3 and the "on" switch. This circuit may be traced from line $L^1$ to rheostat segment 4 as heretofore traced, thence through the crosshead to segment 2 by conductors 27 and 28 through the contacts $G^3$ of relay G by conductors 29, 14 and 15 through the pilot motor by conductors 16 and 17 to line $L^3$. Thus provision is made for continued advance of the rheostat crosshead even upon release of the "on" button but only until the motor accelerates to the desired slow speed point.

As the motor M approaches the desired slow speed relay G commutates the pilot motor connections for limtiation of the main motor speed and for use of the rheostat to maintain a substantially constant slow speed. More particularly, the contacts $G^3$ of the relay are arranged to open at a speed which is below the desired slow speed, whereupon the pilot motor circuit is commutated to extend from rheostat segment 2 by conductors 27 and 30 through a resistance $r^5$ and interrupter I by conductor 31 through the contacts $G^6$ of relay G by conductor 32 through the relay contacts $G^4$ by conductor 33 to and through the pilot motor for continued operation of the pilot motor in the same direction. However, continued operation of the pilot motor is slowed down by the interrupter I and is limited by contacts $G^4$ which are arranged to open at the desired slow speed, thus arresting the pilot motor. Thereafter should the main motor speed for any reason fall off the contacts $G^4$ will reclose to restart the pilot motor for exclusion of more resistance. On the other hand, with the contacts $G^4$ open any increase in the motor speed will cause the relay G to engage its contacts $G^5$ to complete a reversing circuit for the pilot motor to effect exclusion of resistance. This reversing circuit extends to and through relay contact $G^6$, as previously traced, by conductor 32 through contact $G^5$ by conductor 34 through limit switch RL and the pilot motor armature from left to right, and thence through the series field to line $L^3$. Thus as will be understood, the relay is adapted to vibrate in response to variations in the main motor speed to maintain the desired slow speed and to energize the torque switch T should the motor tend to stall.

When desired to increase the speed of motor M it is only necessary to again depress the "on" button to complete the pilot motor circuit for further advance of the crosshead. Depression of the "on" button, as will be apparent, reestablishes the pilot motor circuit independently of relay G and upon an increase in the speed of the motor said relay disengages its contacts $G^6$ to remove the pilot motor from the influence of the reversing contacts $G^5$. Thus the motor M may be thereafter operated at any desired speed by release of the "on" button in an appropriate position of the rheostat crosshead.

With the motor in operation plugging may be effected by depressing the "stop" button, which being in circuit with the windings of the forward switches effects interruption of the forward motor connections and the forward switch F in opening completes through its auxiliary contacts $f$ an energizing circuit for the switch D. This circuit extends from line $L^1$ by conductor 10 through the auxiliary contacts $f$ of switch F by conductor 35 through the contacts $G^2$ of relay G by conductor 36 through the auxiliary contacts $f^1$ of switch F by conductor 37 through winding of switch D and thence to conductor 17 and line $L^3$, whereas response of switch D effects energization of switch B. Response of switch D completes circuit from contacts $G^2$ of relay G by conductors 36 and 38 through auxiliary contacts $d$ by conductor 39 through the operating winding of switch B to conductor 17 and thence to line $L^3$, and when both switches B and D are closed plugging connections are established and maintained until the motor speed is reduced to disengage relay contacts $G^2$ of relay G. Thereupon both switches B and D are deenergized, and assuming the crosshead to be in an intermediate position it is returned to a position to include all resistance for starting. More particularly, when the rheostat crosshead is in an intermediate position the rheostat limit switch RL is closed, whereby a reverse circuit for the pilot motor is established upon opening of the forward switch F. This circuit extends from line $L^1$ by conductor 10 through the auxiliary contacts $f$ of switch F by conductors 35 and 34 to rheostat limit switch RL and thence through the pilot motor armature from left to right to and through the series field $f$ to line $L^3$.

The usual inching and slowdown operations are provided by the "inch" and "off" switches, respectively, but as these switches merely perform their usual functions the circuit commutations effected thereby will not be described.

What I claim as new and desire to secure by Letters Patent is:

1. The combination with a motor, of starting and speed regulating means for said motor including a device responsive to the motor speed and a power operated regulating device operative automatically under control by the former device to maintain a substantially constant speed of said motor, said means affording regulation of said motor for a relatively slow speed or a relatively high speed as desired, and further including means rendering said devices effective for constant speed regulation of the motor when the latter operates at the aforementioned slow speed and ineffective therefor when said motor operates at the aforementioned high speed.

2. The combination with a main motor, of a rheostat providing a wide range of speed variation of said motor, a pilot motor for operating said rheostat, means for periodically interrupting the circuit of said pilot motor to reduce the speed of adjustment of said rheostat, a device responsive to speed variations of said main motor to control said pilot motor for limiting said main motor to a slow speed and for adjusting said rheostat to maintain a substantially constant slow speed of said main motor, and manual control means for said pilot motor to provide for operation of the latter independently of said circuit interrupting means and said speed responsive device whereby the speed of said main motor may be increased at will.

3. The combination with a motor, of means to start said motor and effect operation thereof at a substantially constant slow speed or at a high speed at will, said means comprising a switch providing a high starting torque and a device responsive to variations in motor speed to effect speed regulation and to control said switch for torque reduction and subsequent increase should said motor tend to stall.

4. The combination with a motor, of means to start said motor and effect operation thereof at a substantially constant slow speed or at a high speed at will, said means comprising a switch providing a high starting torque for said motor, power operated speed regulating means and a device responsive to variations in motor speed, said device controlling said switch for torque reduction following starting and for high torque should said motor tend to stall and said device controlling said power operated speed regulating means to provide the aforementioned constant slow speed.

5. The combination with a motor, of resistance in circuit therewith, an electroresponsive switch for excluding a given amount of said resistance for high torque starting and a device responsive to speed variations of said motor to effect operation of said switch following starting of said motor and further operation of said switch if said motor tends to stall.

6. The combination with a motor, of resistance in circuit therewith, an electroresponsive switch for excluding a given amount of said resistance for high torque starting and a device responsive to speed variations of said motor to effect operation of said switch following starting of said motor and further operation of said switch if said motor tends to stall, and other controlling means for said resistance providing for operation of said motor at a relatively slow speed or at a relatively high speed at will, and further providing for variation of said resistance under the control of said speed responsive device to maintain a substantially constant slow speed of said motor.

7. The combination with a motor, of means to effect operation of said motor and plugging of said motor for stopping, said means including a speed responsive device through the medium of which plugging connections are maintained until the motor is reduced to substantially zero speed, and speed regulating means affording either high speed operation of said motor or slow speed operation thereof at will, the last mentioned means comprising a power operated device controlled by said speed responsive device to maintain a substantially constant slow speed.

8. The combination with a motor, of speed regulating means providing for operation of said motor at a relatively slow speed or a relatively high speed at will and further providing for a substantially constant slow speed of said motor, said means comprising a device responsive to speed variations of said motor, a power operated instrumentality controlled by said device to maintain the aforementioned constant slow speed and means to render said device ineffective as an incident to acceleration of said motor to the aforementioned high speed.

9. The combination with a motor, of a power operated rheostat providing a wide range of speed variation of said motor, a device responsive to variations in motor speed associated with said rheostat to limit operation of the latter for a slow motor speed and to maintain a substantially constant slow speed through the medium of said rheostat, and means to free said rheostat from the influence of said device for operation of said rheostat to increase the motor speed.

10. The combination with a motor, of a power operated rheostat providing a wide range of speed variation of said motor, a device responsive to speed variations of said motor to effect reverse operations of said rheostat and manual control means for said rheostat to render said device effective for substantially constant slow speed operation of said motor and ineffective at higher motor speeds.

11. The combination with a main motor, a pilot motor operated rheostat providing a wide range of speed variation of said motor, a device responsive to variations in the main motor speed to effect reverse operations of said rheostat, and manual control means for said rheostat to subject the same to control by said device for a substantially constant slow speed of said main motor or to render said rheostat independent of said device to increase the speed of said motor.

12. The combination with a main motor, a rheostat providing a wide range of speed variation of said motor, a pilot motor for operating said rheostat, means for periodically interrupting the circuit of said pilot motor to reduce the speed of adjustment of said rheostat and a device responsive to speed variations of said main motor to control said pilot motor for limiting said main motor to a slow speed and for adjusting said rheostat to maintain a substantially constant slow speed of said main motor.

13. The combination with a main motor, of a rheostat providing a wide range of speed variation of said motor, a pilot motor for operating said rheostat, means for periodically interrupting the circuit of said pilot motor to reduce the speed of adjustment of said rheostat, a device responsive to speed variations of said main motor to control said pilot motor for limiting said main motor to a slow speed and for adjusting said rheostat to maintain a substantially constant slow speed of said main motor, and manual control means for said pilot motor to provide for operation of the latter independently of said circuit interrupting means and said speed responsive device whereby the speed of said main motor may be increased at will, the arrangement being such that any desired adjustment of said rheostat will be maintained upon release of said manual control means.

In witness whereof, I have hereunto subscribed my name.

RICHARD B. HUNTER.